(12) United States Patent
Confalonieri et al.

(10) Patent No.: US 12,099,457 B2
(45) Date of Patent: Sep. 24, 2024

(54) CONTROLLER FOR MANAGING MULTIPLE TYPES OF MEMORY

(71) Applicant: Micron Technology, Inc., Boise, ID (US)

(72) Inventors: Emanuele Confalonieri, Segrate (IT); Daniele Balluchi, Cernusco Sul Naviglio (IT); Paolo Amato, Treviglio (IT); Danilo Caraccio, Milan (IT); Marco Sforzin, Cernusco Sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 219 days.

(21) Appl. No.: 17/673,731

(22) Filed: Feb. 16, 2022

(65) Prior Publication Data
US 2022/0261363 A1    Aug. 18, 2022

Related U.S. Application Data

(60) Provisional application No. 63/149,863, filed on Feb. 16, 2021.

(51) Int. Cl.
*G06F 13/16* (2006.01)
(52) U.S. Cl.
CPC ................ *G06F 13/1694* (2013.01)
(58) Field of Classification Search
CPC .................................................. G06F 13/1694
USPC ..... 710/5, 16, 20, 33, 52, 305; 711/113, 118
See application file for complete search history.

(56) References Cited

U.S. PATENT DOCUMENTS

| 9,575,882 | B2 | 2/2017 | Nellans et al. |
| 10,684,793 | B2 | 6/2020 | Chung et al. |
| 10,733,048 | B1* | 8/2020 | Avron ............... G06F 11/1012 |
| 2007/0174910 | A1* | 7/2007 | Zachman ............. G06F 21/79 |
| | | | 726/18 |

(Continued)

FOREIGN PATENT DOCUMENTS

KR    10-2019-0031692 A    3/2019

OTHER PUBLICATIONS

International Search Report and Written Opinion from related International Patent Application No. PCT/US2022/016539, dated May 26, 2022, 9 pages.

*Primary Examiner* — Farley Abad
*Assistant Examiner* — Henry W Yu
(74) *Attorney, Agent, or Firm* — Brooks, Cameron & Huebsch, PLLC

(57) ABSTRACT

Systems, apparatuses, and methods related to a controller for managing multiple types of memory are described. A controller includes a front end portion, a central controller portion, a back end portion, and a management unit can manage a first type of memory device that operates according to a first set of timing characteristics and a second type of memory device that operates according to a second set of timing characteristics. The central controller portion is configured to cause performance of a memory operation and comprises a cache memory to buffer data associated performance of the memory operation, a security component configured to encrypt the data before storing the data in the first type of memory device or the second type of memory device, and error correction code (ECC) circuitry to ECC encode and ECC decode the data.

30 Claims, 7 Drawing Sheets

(56) References Cited

U.S. PATENT DOCUMENTS

| | | | |
|---|---|---|---|
| 2010/0005202 A1* | 1/2010 | Ferraiolo | G06F 11/2007 |
| | | | 710/51 |
| 2010/0005218 A1* | 1/2010 | Gower | G06F 13/4234 |
| | | | 711/E12.082 |
| 2014/0181327 A1* | 6/2014 | Cohen | G06F 3/0611 |
| | | | 710/5 |
| 2015/0106556 A1* | 4/2015 | Yu | G06F 12/0246 |
| | | | 711/103 |
| 2015/0143037 A1* | 5/2015 | Smith | G06F 3/0659 |
| | | | 711/148 |
| 2017/0364407 A1 | 12/2017 | Osada | |
| 2018/0336092 A1* | 11/2018 | Kim | G06F 11/1048 |
| 2019/0087114 A1 | 3/2019 | Choi | |
| 2019/0273642 A1 | 9/2019 | Hasbun et al. | |
| 2019/0362790 A1 | 11/2019 | Kajigaya | |
| 2020/0065527 A1* | 2/2020 | Rodgers | G06F 21/74 |
| 2020/0104208 A1* | 4/2020 | Heo | G06F 11/1044 |
| 2020/0201782 A1 | 6/2020 | Tsao | |

\* cited by examiner

CONTROLLER FOR MANAGING MULTIPLE TYPES OF MEMORY

PRIORITY INFORMATION

This application claims the benefit of U.S. Provisional Application Ser. No. 63/149,863, filed on Feb. 16, 2021, the contents of which are incorporated herein by reference.

TECHNICAL FIELD

The present disclosure relates generally to semiconductor memory and methods, and more particularly, to apparatuses, systems, and methods for a controller for managing multiple types of memory.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
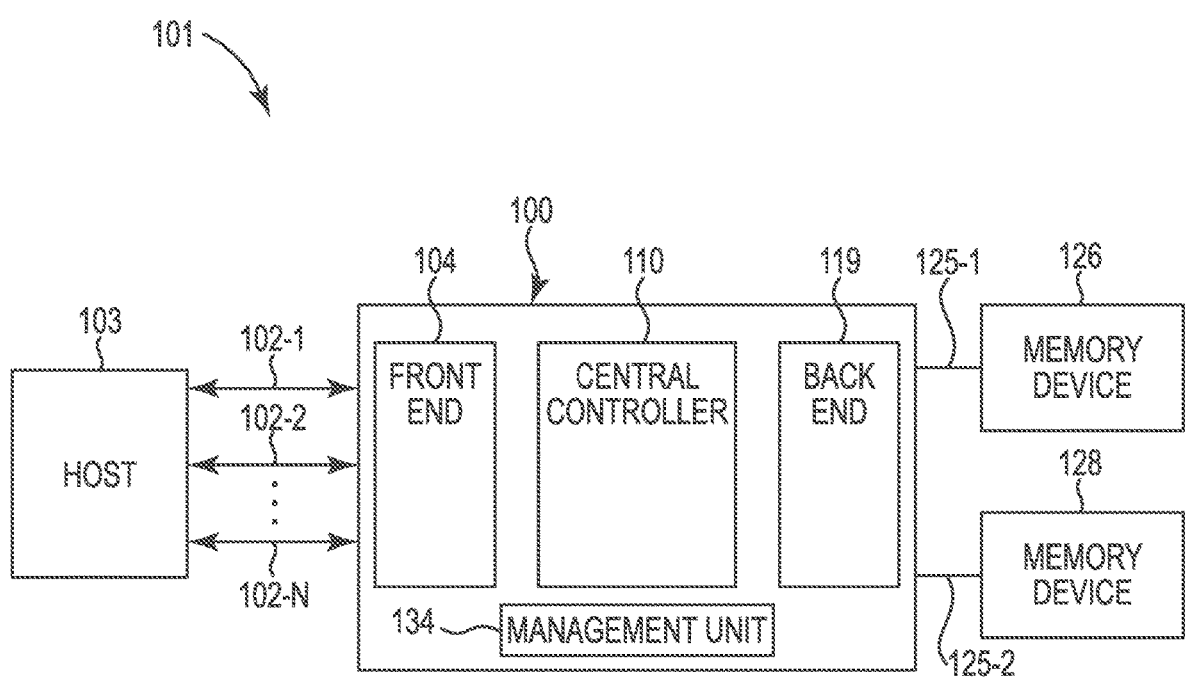
FIG. 1 illustrates a functional block diagram in the form of a computing system including a controller for managing multiple types of memory in accordance with a number of embodiments of the present disclosure.

Systems, apparatuses, and methods related to a controller for managing multiple types of memory are described. A controller includes a front end portion, a central controller portion, a back end portion, and a management unit that can manage a first type of memory device that operates according to a first set of timing characteristics and a second type of memory device that operates according to a second set of timing characteristics. The central controller portion is configured to cause performance of a memory operation and comprises a cache memory to store data associated performance of the memory operation, a security component configured to encrypt the data before storing the data in the first type of memory device or the second type of memory device and decrypt the data before the data is transferred to the cache memory or a memory component that requested the data, and error correction code (ECC) circuitry to ECC encode and ECC decode the data. In some embodiments, the memory component that requested the data can be the first type of memory device or the second type of memory device. In some embodiments, if the cache memory is disabled, the data is transferred to the front end portion.

Systems, apparatuses, and methods related to a controller (e.g., a memory or media controller) for managing multiple types of memory are described. The controller can orchestrate performance of operations to write data to at least one of multiple types of memory devices. In some embodiments, a first type of memory device can be a DRAM memory device and a second type of memory device can be a FeRAM memory device or other type of memory device. The DRAM memory device and the FeRAM memory device can be simultaneously coupled to the memory controller.

The memory controller can include a front end portion, a central controller portion, a back end portion, and a management unit. The front end portion can couple the memory controller to external circuitry or an external device, such as a host computing device that can generate requests to read or write data from and/or to the memory device(s). The central controller portion can modify (e.g., encrypt and/or error correct) the data before data is written to at least one of the multiple types of memory devices. The back end portion can couple to multiple types of memory devices through channels, which can be used to write the data to the multiple types of memory devices.

The memory controller can include a variety of components to manage each of the types of memory devices coupled to the memory controller. In some embodiments, the memory controller can enable or disable certain components depending on whether the components are used to transfer the data from the host to one of the memory devices. For example, a cache memory component associated with the memory controller can be enabled when transferring data to a FeRAM memory device and disabled when transferring data to a DRAM memory device. The memory controller can also be used to manage one type of memory device, such as a DRAM memory device. In memory systems in which the memory controller manages one type of memory device, instead of managing multiple types of memory devices, the memory controller can still enable or disable components, such as the cache memory associated with the memory controller, when transferring data to a memory device.

As memory devices are tasked with performing more complicated operations, multiple types of memory devices with different sets of timing characteristics may be implemented in a memory system to store different types of data. In some embodiments, one of the timing characteristics can be the bank active timing (tRAS). As used herein, the term "bank active timing" generally refers to the time between a row activation command and a precharge command.

In some approaches, different controllers may be used to manage different types of memory devices. Each additional controller used to manage the different types of memory devices occupies space within the memory system. As more space is occupied by the additional controllers, less space is available in the memory system for components to perform other operations. Cutting edge memory devices continually decrease in size. Approaches that decrease the amount of space available in a memory system leads to memory components being built closer together. The decreased amount of space between the memory components can cause the heat released from the operation of a memory component to heat up other memory components. This can increase the probability of the memory components failing due to experiencing more heat than intended.

In contrast, embodiments described herein are directed to a controller configured to manage multiple types of memory devices, such as memory devices that operate according to differing sets of timing characteristics. By implementing a controller that includes components to allow the controller to manage multiple types of memory devices with differing sets of timing characteristics, less space in a memory system can be dedicated to managing the memory devices because a single controller can be used to manage the memory devices instead of multiple controllers. By dedicating less space within a memory system to managing the memory devices, more space within the memory system becomes available to implement components that perform different functions. Further, because some embodiments of the present disclosure are directed to a single memory controller to perform the operations described herein (as opposed to the multiple controller architectures of some approaches), issues that can arise from inadequate thermal dissipation that can be prevalent in multiple controller approaches can be mitigated.

Embodiments of the single memory controller may include a single memory controller with a single internal controller that can manage multiple types of memory. Other embodiments of the single memory controller may include a single memory controller with multiple internal controllers such that each internal controller manages each type of memory device coupled to the single memory controller. The internal controller in the embodiment of the single memory controller including one internal controller may execute instructions in less time than each of the multiple internal controllers in the embodiment of the single memory controller including multiple internal controllers such that the embodiment with one internal controller and the embodiment including multiple internal controllers achieve similar performance.

In some embodiments, the memory system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

FIG. 1 illustrates a functional block diagram in the form of a computing system 101 including a controller 100 for managing multiple types of memory (e.g., the memory devices 126, 128) in accordance with a number of embodiments of the present disclosure. The computing system 101 can include a memory controller 100 comprising a front end portion 104, a central controller portion 110, and a back end portion 119. The computing system 101 can include a host 103 and memory devices 126, 128.

In some embodiments, the memory controller 100 can manage a DRAM memory device 126 having a first tRAS and a FeRAM memory device 128 having a second tRAS. In some embodiments, the tRAS of the FeRAM memory device 128 is different from tRAS of the DRAM memory device. In some embodiments, the DRAM memory device may include other characteristics that differ from the FeRAM memory device. For example, the DRAM memory device and the FeRAM memory device differ in an amount of memory banks, a type of command encoding, a refresh command, a refresh timing, or a combination thereof. Further, in some embodiments, instead of managing both a DRAM memory device 126 and a FeRAM memory device 128, the memory controller 100 can be configured to manage either just DRAM memory devices 126 or just FeRAM memory devices 128.

The memory controller 100 can have a front end portion 104 that includes an interface to couple the memory controller 100 to the host 103 through input/output (I/O) lanes 102-1, 102-2, . . . , 102-N (individually or collectively referred to as I/O lanes 102) and circuitry to manage the I/O lanes 102. In some embodiments, there can be eight (8) I/O lanes 102 and in other embodiments there can be sixteen (16) I/O lanes 102. In some embodiments, the plurality of I/O lanes 102 can be configured as a single port.

The memory controller 101 can include a central controller portion 110 that can control, in response to receiving a request from the host 103, performance of a memory operation. The memory operation can be a memory operation to read data from a memory device 126, 128 or an operation to write data to a memory device 126, 128. In some embodiments, the central controller portion 110 can, in response to receiving a request from the host 103, control writing of multiple pages of data substantially simultaneously.

The central controller portion 110 can include a cache memory (e.g., the cache 212 illustrated in FIG. 2, herein) to store data associated with performance of a memory operation and/or a security component (e.g., the security component 214 illustrated in FIG. 2, herein) to encrypt data before the data is stored in the DRAM memory device 126, the FeRAM memory device 128, and/or the cache memory. Examples of the security component can include, but are not limited to, software and circuitry configured to implement data encryption, data hashing, data masking, and data tokenization. In some embodiments, in response to receiving a request from the host 103, data from the host 103 can be stored in cache lines of the cache memory. The data in the cache memory can be written to a memory device 126, 128. In some embodiments, the data can be encrypted using an Advanced Encryption Standard (AES) encryption before the data is stored in the cache memory.

The central controller portion 110 can include error correction code (ECC) encoding circuitry (e.g., the ECC encoding circuitry 216 illustrated in FIG. 2, herein) to ECC encode the data and ECC decoding circuitry (e.g., the ECC decoding circuitry 218 illustrated in FIG. 2, herein) to ECC decode the data. As used herein, the term "ECC encoding" can refer to encoding data by adding redundant bits to the data. The encoding, in general, could also be non-systematic. Therefore, the encoder can generally map the data vector of k bits in a codeword composed on n (>k) bits without an explicit separation between original data and parity bits. As used herein, the term "ECC decoding" can refer to examining the ECC encoded data to check for any errors in the data. In general, the ECC can not only detect the error but also can correct a subset of the errors it is able to detect. The ECC encoding circuitry can encode data that will be written to the DRAM memory device 126 and the FeRAM memory device 128. In some embodiments, an error detected in the data can be corrected immediately upon detection. The ECC decoding circuitry can decode data that has been previously ECC encoded.

In some embodiments, the memory controller 100 can comprise a back end portion 119 comprising a media controller and a physical (PHY) layer that couples the memory controller 100 to a plurality of memory ranks. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can be a plurality of channels 125-1, 125-2. As used herein, the term "memory ranks" generally refers to a plurality of memory chips (e.g., DRAM memory chips and/or FeRAM memory chips) that can be accessed simultaneously. In some embodiments, the channel 125 may have a sixteen (16)-bit data bus. If there are four 16-bit memory chips connected to the channel 125, each memory chip may correspond to a memory rank. In these embodiments, there may be four (4) memory ranks. In some embodiments, the four memory chips may be eight (8)-bit memory chips instead of 16-bit memory chips. In these embodiments, two memory chips may be combined to form a 16-bit channel and result in the four memory chips forming two memory ranks. Precharge and active commands may be executed concurrently in different memory ranks. Read and write commands may not be executed concurrently in different memory ranks because the read commands and the write commands may use the data channel which is shared in a multi-rank memory topology. In some embodiments, a page size of a first type of memory device (e.g., DRAM memory device) 126 can be larger than a page size of the second type of memory device (e.g., FeRAM memory device) 128.

In some embodiments, the memory controller 100 can include a management unit 134 to initialize, configure, and/or monitor characteristics of the memory controller 100. The management unit 134 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band data and/or commands" generally refers to data and/or commands transferred through a transmission medium that is different from the main transmission medium of a network. For example, out-of-band data and/or commands can be data and/or commands transferred to a network using a different transmission medium than the transmission medium used to transfer data within the network.

Figure 2:
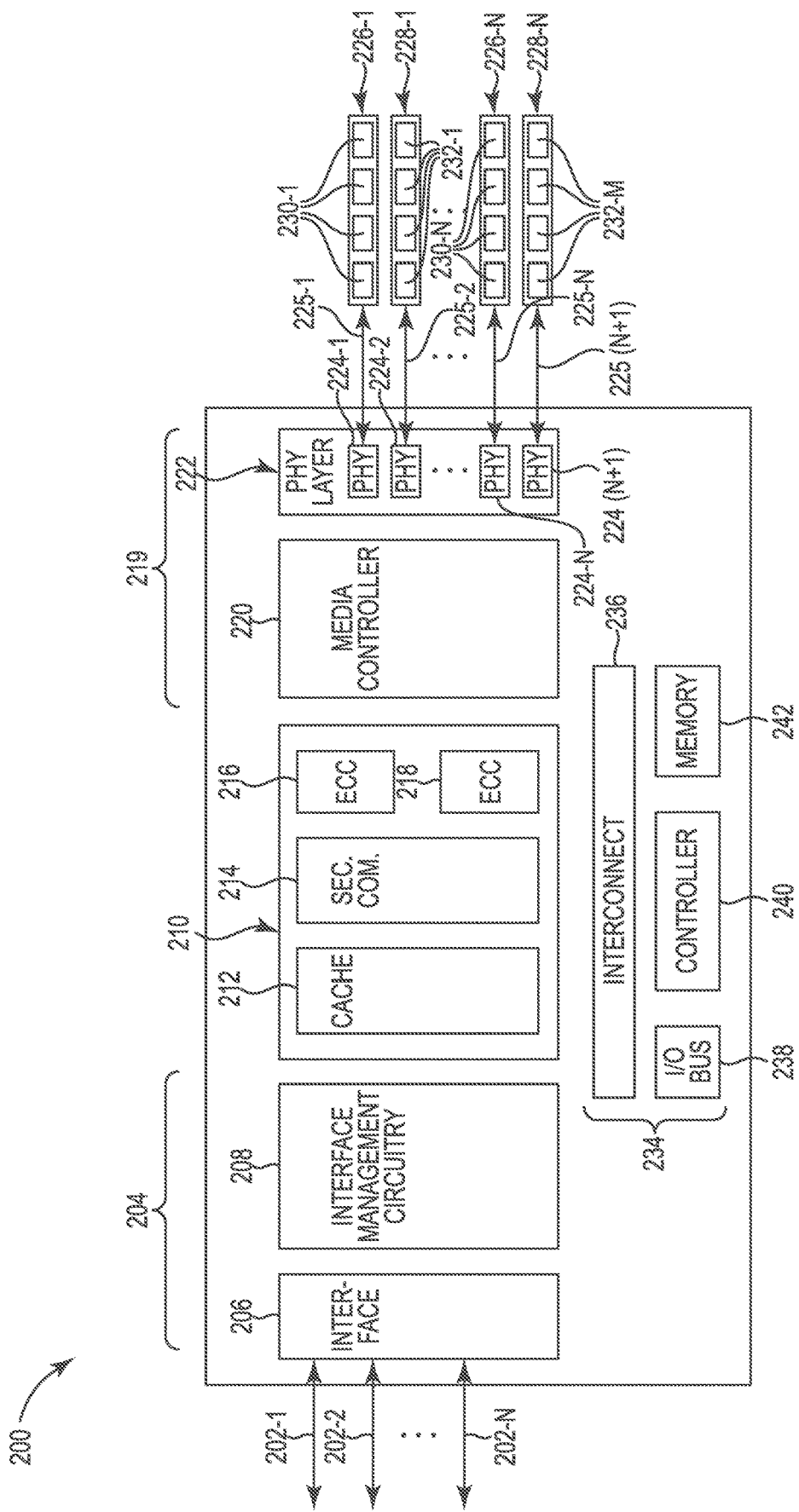
FIG. 2 illustrates a functional block diagram in the form of a controller for managing multiple types of memory in accordance with a number of embodiments of the present disclosure.

FIG. 2 illustrates a functional block diagram in the form of a memory controller 200 for managing multiple types of memory in accordance with a number of embodiments of the present disclosure. A memory controller 200 is configured to manage a first type of memory device (e.g., DRAM memory device) 226-1, . . . , 226-N (individually or collectively referred to as the first type of memory device 226) that operates according to a first set of timing characteristics and a second type of memory device (e.g., FeRAM memory device) 228-1, . . . , 228-N (individually or collectively referred to as the second type of memory device 228) that operates according to a second set of timing characteristics. Further, in some embodiments, instead of managing both a DRAM memory device 226 and a FeRAM memory device 228, the memory controller 200 can be configured to manage either just DRAM memory devices 226 or just FeRAM memory devices 228. In some embodiments, the first set of timing characteristics can be a tRAS of the DRAM memory device 226 and the second set of timing characteristics can be a tRAS of the FeRAM memory device 228. In some embodiments, the first set of timing characteristics can correspond to a timing that is greater than the second set of timing characteristics. In some embodiments, a memory controller 200 can include a front end portion 204, a central controller portion 210, and a back end portion 219.

As shown in FIG. 2, a front end portion 204 can include an interface 206 that includes multiple I/O lanes 202-1, 202-2, . . . , 202-N (individually or collectively referred to as I/O lanes 202), as well as circuitry 208 to manage the interface 206. The interface 206 can be a peripheral component interconnect express (PCIe) 5.0 interface coupled to the I/O lanes 202. In some embodiments, the memory controller 200 can receive access requests involving at least one of the cache memory 212, the first type of memory device 226, and/or the second type of memory device 228 via the PCIe 5.0 interface 206 according to a CXL protocol. The interface 206 can receive data from a host (e.g., the host 103 shown in FIG. 1) through the of I/O lanes 202. The interface management circuitry 208 may use CXL protocols to manage the interface 206.

A central controller portion 210 can be configured to cause performance of a memory operation. The central controller portion 210 can include a cache memory 212 to store data associated with performance of the memory operation. The cache memory 212 can be a thirty two (32) way set-associative cache memory including multiple cache lines. The cache line size can be equal to or greater than the memory controller 200 access granularity (64 byte). For example, each cache line can include 256 bytes of data. In some embodiments, each cache line can comprise 512 bytes of data.

Read and write requests of CXL memory systems can be 64 bytes in size. Therefore, data entries in the cache memory 212 can have 64 bytes of data. Each cache line can comprise 256 bytes. Therefore, multiple 64 byte requests can be stored in each cache line. In response to a requests from the host, the memory controller 200 can write 256 bytes of data to a memory device 226, 228. In some embodiments, the 256 bytes of data can be written in 64 byte chunks.

As shown in FIG. 2, a central controller portion 210 can include a security component 214 to encrypt data before storing the data in the DRAM device 226 or FeRAM memory device 228 and decrypt the data before the data is transferred to the cache 212. The data can be transferred from the cache 212 to the DRAM memory device 226 or the FeRAM memory device 228. As stated before, the security component 214 can use an AES encryption to encrypt the data. In some embodiments, the security component 214 may encrypt data that is written to the FeRAM memory device 228 but may not encrypt the data that is written to the DRAM memory device 226. The data written to the FeRAM memory device 228 may be encrypted because the FeRAM memory device 228 can have security deficiencies that the DRAM memory device 226 does not have. The security component 214 can be bypassed when it is not used, such as when data is being written to the DRAM memory device 226. In some embodiments, the security component 214 can be enabled or disabled. For example, the security component 214 can be enabled when writing memory to a persistent memory device, such as an FeRAM memory device 228.

As shown in FIG. 2, the central controller portion 210 can include error correction code (ECC) circuitry to ECC encode the data and ECC decode the data. In some embodiments, the memory controller 210 can implement low power chip kill (LPCK) error correction. As used herein, the term "chip kill" generally refers to a form of error correction that protects memory systems (e.g., the memory system 101 shown in FIG. 1) from any single memory chip failure as well as multi-bit error from any portion of a single memory chip. In some embodiments, the LPCK circuitry can increase the stability of the data and correct errors in the data. One approach for chip kill protection is on-the-fly correction implementation. On-the-fly correction can form a plurality of codewords out of four (4)-bit symbols of each of a plurality of die (e.g., memory chip). For example, if there are eleven (11) die each containing 4 separate bit symbols, with each bit symbol containing 4 bits, the 11 die can form 4 codewords each with 11 separate bit symbols comprising a total of forty four (44) bits per codeword.

In some embodiments, a first codeword can comprise the first bit symbol of each die, a second codeword can comprise the second bit symbol of each die, a third codeword can comprise the third bit symbol of each die, and a fourth codeword can comprise the fourth bit symbol of each die. In other words, the eight data bit symbols and 3 parity bit symbols of a codeword can be stored in eleven (11) die. Eight (8) of the 11 die can contain data bit symbols and the three (3) remaining die of the 11 die can contain parity bit symbols. Adding 3 parity bit symbols can allow the central controller portion 210 to correct up to one symbol error in each codeword and to detect up to two symbol errors. If instead of adding 3 parity bit symbols, only two (2) parity bits are added, the central controller portion 210 can correct up to one symbol error but only detect one symbol error. In some embodiments, the data bit symbols and the parity bit symbols can be written or read concurrently from the 11 die by the ECC encoding circuitry 216 and the ECC decoding circuitry 218. If every bit symbol in a die fails, only the bit symbols from that die in the codeword will fail. This allows memory contents to be reconstructed despite the complete failure of one die.

As shown in FIG. 2, the memory controller 200 can include a back end portion 219, including a media controller portion 220 comprising a plurality of media controllers and a physical (PHY) layer portion 222 comprising a plurality of PHY layers 224-1, 224-2, 224-N, . . . , 224-(N+1) (individually or collectively referred to as PHY layer 224). In some embodiments, the back end portion 219 is configured to couple the PHY layer portion 222 to a plurality of memory ranks 230-1, . . . , 230-N (individually or collectively referred to as memory ranks 230) of a first memory device 226 and a plurality of memory ranks 232-1, . . . , 232-M (individually or collectively referred to as memory ranks 232) of a second memory device 228-1, . . . , 228-N (individually or collectively referred to as second memory device 228). The media controller 220 can include both open-page policies and a closed-page policies. As used herein, the term "open-page policy" generally refers to a policy which allows a memory controller (e.g., media controller 220) to leave a page of memory open for a certain amount of time after a read operation or a write operation is performed. As used herein, the term "closed-page policy" generally refers to a policy that ensures that a page of memory is closed immediately after a read operation or a write operation is performed. In some embodiments, the FeRAM memory device 228 can implement a closed-page policy with an additional requirement that the tRAS and other timings of the FeRAM memory device 228 are different from DRAM timings.

In embodiments where LPCK error correction is used, the media controller portion 220 can be a single media controller 220. When implementing LPCK error correction, a plurality of channels 225-1, 225-2, 225-N, . . . , 225-(N+1) (individually or collectively referred to as the plurality of channels 225) can be driven concurrently to write data to the DRAM memory device 226 and/or the FeRAM memory device 228. In some embodiments, instead of using a single media controller 220, multiple media controllers can be used to drive the plurality of channels 225 in the LPCK architecture. When multiple media controllers are used to drive the channels 225 concurrently, the media controllers are utilized substantially simultaneously.

As used herein, the term "substantially" intends that the characteristic needs not be absolute, but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the multiple memory controllers can be utilized such that they are writing data to the memory devices at the same time regardless if one of the media controllers commences or terminates prior to the other.

Each of the plurality of media controllers can receive a same command and address and drive the plurality of channels 225 substantially simultaneously. By using the same command and address for the plurality of media controllers, each of the plurality of media controllers can utilize the plurality of channels 225 to perform the same memory operation on the same plurality memory cells.

A back end portion 222 can include multiple PHY layers 224 and the media controller portion 220 that is configured to drive the channels 225 that couple PHY layers 224 to the memory ranks 230, 232. In some embodiments, the memory ranks 230, 232 can be DRAM memory ranks 230 and/or FeRAM memory ranks 232. In some embodiments, the memory controller 200 can be coupled to the memory ranks 230, 232 through channels 225 coupled to the back end portion 219 and each of the channels 225 is coupled to four (4) memory ranks 230, 232.

The memory controller 200 can include a management unit 234 configured to initialize, configure, and/or monitor characteristics of the memory controller 200. In some embodiments, the management unit 234 includes an I/O bus 238 to manage out-of-band data and/or commands, a management unit controller 240 to execute instructions associated with initializing, configuring, and/or monitoring the characteristics of the memory controller 200, and a management unit memory 242 to store codes and/or data associated with managing and/or monitoring the characteristics of the memory controller 200. An endpoint of the management unit 234 can be exposed to the host system (e.g., the host 103 shown in FIG. 1) to manage data. In some embodiments, the characteristics monitored by the management unit 234 can include a voltage supplied to the memory controller 200 or a temperature measured by an external sensor, or both. Further, the management unit 234 can include an advanced high-performance bus (AHB) interconnect 236 to couple different components of the management unit 234.

As stated above, the I/O bus 238 can be configured to transfer out-of-band data and/or commands. In some embodiments, the I/O bus 238 can be a System Management Bus (SMBus). As used herein, the term "SMBus" generally refers to a single-ended simple two-wire bus for the purpose of lightweight communication. Further, the management unit 234 can include circuitry to manage in-band data. As used herein, the term "in-band data" generally refers to data that is transferred through the main transmission medium within a network, such as a local area network (LAN).

The management unit 234 can include a management unit controller 240. In some embodiments, the management unit controller 240 can be a controller that meets the Joint Test Action Group (JTAG) standard and operate according to an Inter-Integrate Circuit ($I^2C$ or $I^3C$) protocol, and auxiliary I/O circuitry. As used herein, the term "JTAG" generally refers to an industry standard for verifying designs and testing printed circuity boards after manufacture. As used herein, the term "$I^2C$" generally refers to a serial protocol for a two-wire interface to connect low-speed devices like microcontrollers, I/O interfaces, and other similar peripherals in embedded systems. In some embodiments, the auxiliary I/O circuitry can couple the management unit 234 to the memory controller 200. Further, firmware for operating the management unit can be stored in the management unit memory 242. In some embodiments, the management unit memory 242 can be a flash memory such as flash NOR memory or other persistent flash memory device.

Figure 3:
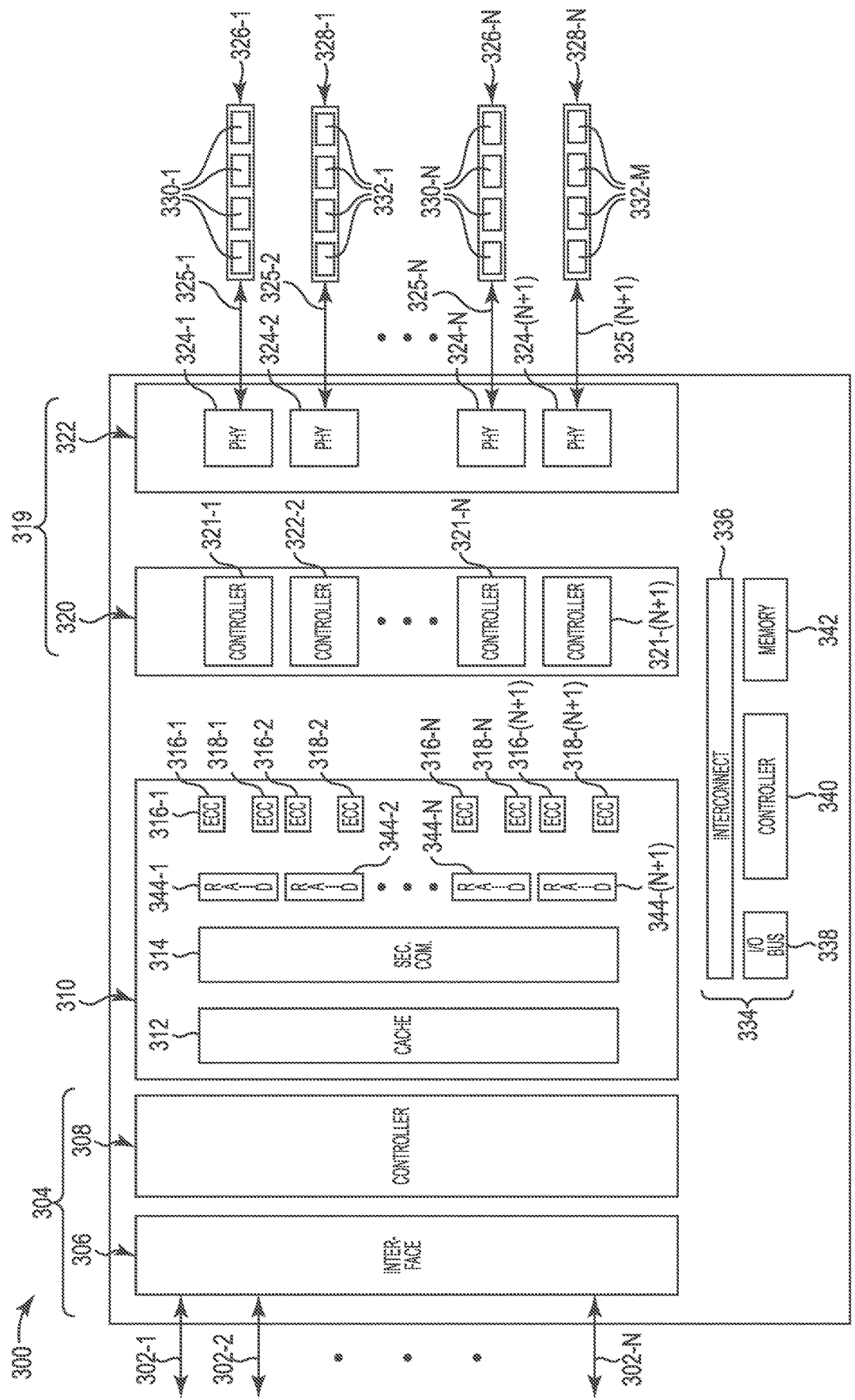
FIG. 3 illustrates a functional block diagram in the form of another controller for managing multiple types of memory in accordance with a number of embodiments of the present disclosure.

FIG. 3 illustrates a functional block diagram in the form of another controller 300 for managing multiple types of memory in accordance with a number of embodiments of the present disclosure. A memory controller 300 is configured to manage a dynamic random access memory (DRAM) memory device 326-1, . . . , 326-N (individually or collectively referred to as DRAM memory device 326) having a first bank active timing (tRAS) and a ferroelectric random access memory (FeRAM) memory device 328-1, . . . , 328-N (individually or collectively referred to as FeRAM memory device 328) having a second tRAS. As previously stated, the DRAM memory device and the FeRAM memory device may differ in multiple ways including, but not limited to different command encoding and a different number of memory banks. Further, in some embodiments, instead of managing both a DRAM memory device 326 and a FeRAM memory device 328, the memory controller 300 can be configured to manage either just DRAM memory devices 326 or just FeRAM memory devices 328. As shown in FIG. 3, the memory controller 300 can include a front end portion 304, a central controller 310, and a back end portion 319.

As shown in FIG. 3, the front end portion 304 can include an interface 306 that includes multiple I/O lanes 302-1, 302-2, . . . , 302-N (individually or collectively referred to as I/O lanes 302) and a controller 308 to manage the interface 306. In some embodiments the quantity of I/O lanes 302 can be eight (8) I/O lanes and in other embodiments, the quantity of I/O lanes 302 can be sixteen (16) I/O lanes. Increasing the amount of I/O lanes 302 can increase the amount of data transferred to and from the memory controller 300. In some embodiments, the I/O lanes are configured to transfer access requests to or from circuitry external to the memory controller at a rate of at least thirty-two (32) gigatransfers per second (GT/s). More specifically, each of the I/O lanes can be configured to transfer the requests at a rate of at least 32 GT/s. Therefore, increasing the number of I/O lanes can increase the amount of data written per second. Further, in some embodiments, the I/O lanes can be configured to transfer access requests to or from circuitry external to the memory controller according to a compute express link protocol.

As shown in FIG. 3, a central controller 310 that can cause performance of a read operation or a write operation, or both can include a cache memory 312 to store data associated with the read operation or write operation, or both, and increase a speed of accessing the data. The cache memory 312 can be used to store data received from the host and write the stored data to the DRAM memory device 326 and/or the FeRAM memory device 328. Increasing the speed of accessing the data is part of increasing the efficiency of accessing the data. In some embodiments, the cache memory 312 can increase the efficiency of accessing the data by allowing the FeRAM memory device 326 to receive data in 64 byte blocks. A CXL memory system (e.g., memory system 301) can request data at a granularity of 64 bytes but the data may be accessed at a granularity of 256 bytes. Storing data in the cache memory 312 can allow the FeRAM memory device 328 to access data in 64 byte chunks because the cache memory 312 can send data in 64 byte chunks. Use of the cache memory 312 can also increase the efficiency of the memory system because the cache memory 312 can prefetch the data and store the data in multiple 64 byte blocks in the case of a cache miss. This can increase the efficiency of the CXL memory system because, instead of searching a separate memory device in the event of a cache miss, the data can be read from the cache memory 312 because the data was prefetched by the cache memory 312. Less time and energy may be used accessing the prefetched data than would be used if the memory system has to search for the data before accessing the data.

As shown in FIG. 3, the central controller 310 can include a security component 314 to encrypt the data before storing the data in the DRAM memory device 326 or the FeRAM memory device 328 and decrypt the data before the data is transferred to the cache. As stated above, the security component 314 can encrypt the data using AES encryption. In some embodiments, the data can bypass the security component 314 and avoid encryption. For example, when data is written from the host to the DRAM memory device 326, the data can bypass the security component and be written into the DRAM memory device 326 as unencrypted data. The data can bypass the security component when being written to the DRAM memory device 326 because the DRAM memory device 326 may not have the same vulnerabilities as the FeRAM memory device 328. This can increase the speed of a CXL memory system because bypassing the security component 314 can decrease the power consumed and/or the time used to transfer data. Therefore, by engaging the security component 314 in circumstances when the security component 314 provides a more significant benefit and bypassing the security component 314 in circumstances where the security component 314 provides a less significant benefit, the efficiency of the memory system will increase.

As shown in FIG. 3, the central controller 310 can include ECC or CRC encoding circuitry 316-1, 316-2, 316-N, . . . , 316-(N+1) (individually or collectively referred to as ECC encoding circuitry 316) to ECC/CRC encode the data and ECC or CRC decoding circuitry 318-1, 318-2, 318-N, . . . , 318-(N+1) (individually or collectively referred to as ECC decoding circuitry 318) to ECC/CRC decode the data. In some embodiments, the central controller 310 can also include a plurality of redundant array of independent disks (RAID) components 344-1, 344-2, 344-N, . . . , 344-(N+1) (individually or collectively referred to as RAID components 344) to store the data. As used herein, the term "RAID components" generally refers to data storage virtualization technology that combines multiple physical memory chips into one or more logical units for the purposes of data redundancy, performance improvement, or both. In some embodiments, the central controller 310 can include a finite state machine (FSM) and a plurality of RAID components, wherein the FSM is operable to increase the reliability of the data and correct errors in the data.

Each of the RAID components 344 can be coupled to different ECC/CRC encoding circuitry 316 and ECC/CRC decoding circuitry 318. The ECC must have the detection ability to trigger the RAID mechanism every time an error is detected in the user data pattern. Moreover, the ECC can also have an additional correction ability to correct a subset of errors detected in the decoding phase. Typically, the ECC reduces to a CRC (Cyclic Redundancy Check) code that just allow to detect the error and trigger the RAID recovery process. In some embodiments, each of the RAID components 344 can correspond to one of the media controllers 321-1, 321-2, 321-N, . . . , 321-(N-+1) (individually or collectively referred to as media controllers 321). This allows a separate RAID component 344 and a separate media controller 321 to be dedicated to each of the channels 325-1, 325-2, . . . , 325-N, 325-(N+1). A RAID state machine can implement the functionality of the RAID components 344. By dedicating a separate RAID component 344 and a separate media controller 321 to each channel 325, each channel 325 can be driven individually and receive a separate command and address than other channels 325. In some embodiments, each media controller 321 executes commands independent of the other media controllers 321. This RAID architecture can provide more flexibility to the memory system in regard to how much data is written to a memory device 326, 328 and when the data is written to a memory device 326, 328 in comparison to the LPCK architecture. In some embodiments, a RAID component 344 can be striped across multiple channels 325. If a RAID component 344 is striped across multiple channels 325, a RAID state machine can be shared across multiple channels 325. This allows a RAID component 344 to drive a plurality of channels 325 substantially simultaneously.

As shown in FIG. 3, the memory controller portion 300 can include a back end portion 319 including a media controller portion 320 comprising a plurality of media controllers 321 and a physical (PHY) layer portion 322 comprising a plurality of PHY layers 324-1, 324-2, . . . , 324-N+1 (individually or collectively referred to as PHY layers 324), wherein the back end portion 319 is configured to couple the PHY layer portion 322 to a plurality of memory ranks. In some embodiments, the memory ranks can include DRAM memory ranks 330-1, . . . , 330-N (individually or collectively referred to as DRAM memory ranks 330) and FeRAM memory ranks 332-1, . . . , 332-M (individually or collectively referred to as FeRAM memory ranks 332). Further, in some embodiments, the memory ranks can include just DRAM memory ranks 330 or just FeRAM memory ranks 332. In some embodiments, the back end portion 319 can be connected to the plurality of memory ranks 330, 332 through the plurality of channels 325 and each of the plurality of channels 325 is coupled to memory ranks 330, 332 in a range of one (1) to eight (8) memory ranks 330, 332. In some embodiments, each of the plurality of channels 325 is coupled to five (5) memory ranks.

As stated above, each media controller 321 can correspond to a RAID component 344, as well as ECC encoding circuitry 316 and ECC decoding circuitry 318. Each media controller 321 can also correspond to one of the plurality of PHY layers 324. Each PHY layer 324 can be coupled to a DRAM memory device 326 or a FeRAM memory device 328 through a channel 325. In some embodiments, each media controller 321 can execute commands independent of the other media controllers 321. Therefore, data can be transferred from a PHY layer 324 through a channel 325 to a memory device 326, 328 independent of other PHY layers 324 and channels 325.

As shown in FIG. 3, the memory controller 300 can include a management unit 334 configured to initialize, configure, and/or monitor a plurality of characteristics of the memory controller 300. The management unit 334 can include an I/O bus 338 to transfer out-of-band data and/or commands, a microcontroller 340 to execute instructions associated with initializing, configuring, and/or monitoring characteristics of the memory controller 300, and a management unit memory 342 to store codes and data associated with managing and/or monitoring the characteristics of the memory controller 300. The characteristics of the memory controller 300 that the management unit 334 can monitor can include, but are not limited to, the amount of voltage being applied to the memory controller 300 and the temperature of the memory controller 300.

Figure 4:
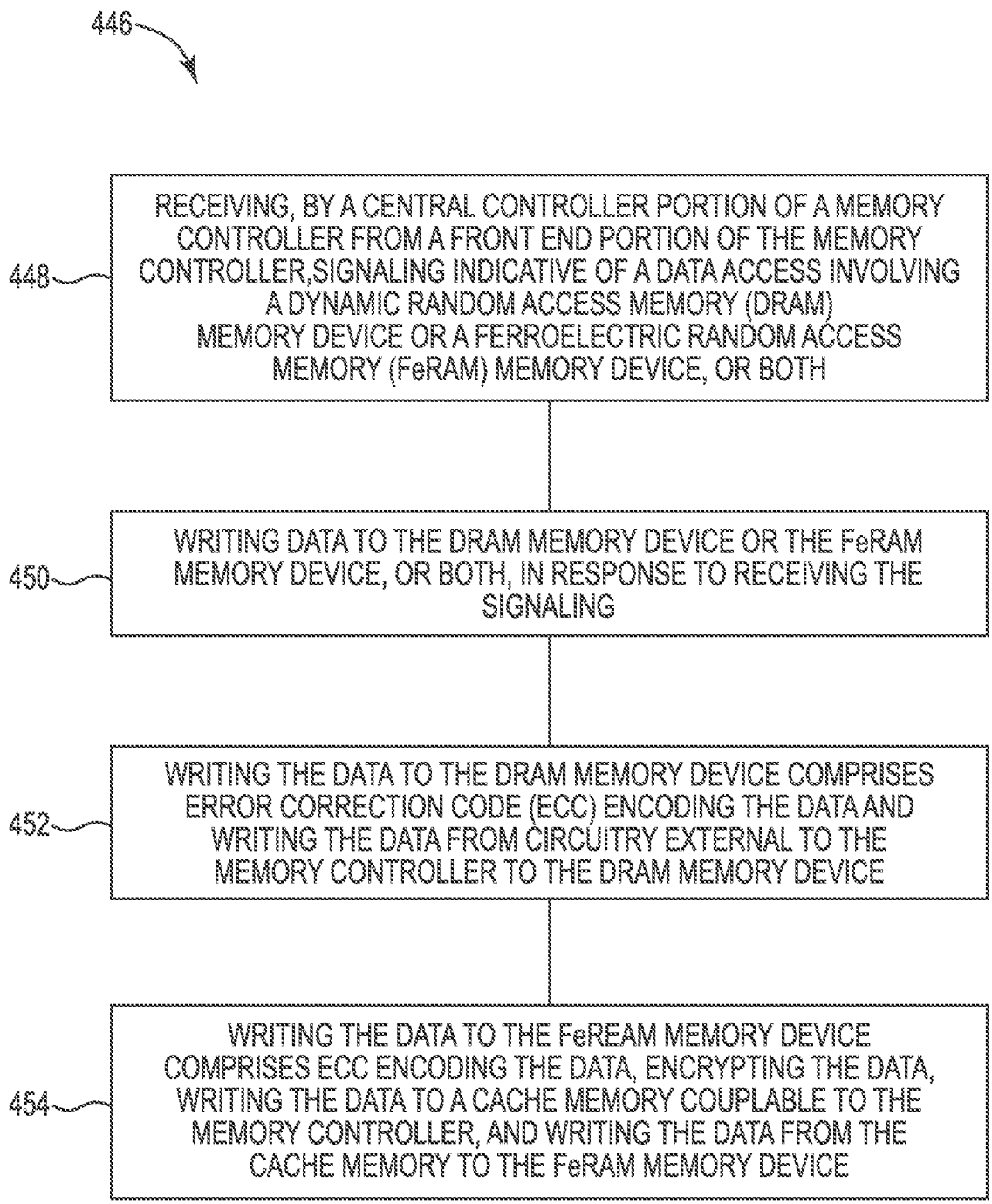
FIG. 4 illustrates a flow diagram of an example method for managing multiple types of memory in accordance with a number of embodiments of the present disclosure.

FIG. 4 illustrates a flow diagram of an example method 446 for managing multiple types of memory in accordance with a number of embodiments of the present disclosure. The method 446 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 448, the method 446 can include receiving, by a central controller portion of a memory controller from a front end portion of the memory controller, signaling indicative of a data access involving one of either a DRAM memory device or a FeRAM memory device. The signaling can be sent from a host to the central controller portion. In some embodiments, the central controller portion can receive the signaling at a rate of 32 GT/s.

At block 450, the method 446 can include writing data to the one of either the DRAM memory device or the FeRAM memory device in response to receiving the signaling. In some embodiments, writing the data can include writing unencrypted data to the DRAM memory device and writing encrypted data to the FeRAM memory device. In some embodiments, writing the data can include writing the data to the DRAM memory device or the FeRAM memory device, or both, by writing the data to a plurality of memory ranks inside the DRAM memory device and the FeRAM memory device.

At block 452, the method 446 can include writing the data to the DRAM memory device comprising ECC/CRC encoding the data and writing the data from circuitry external to the memory controller to the DRAM memory device. ECC encoding the data can allow the data to be recovered if there are errors in the data while the data is being written or data is lost at a later time. While CRC encoding the data can allow errors to be detected. In a memory controller with LPCK architecture, there can be one set of ECC encoding circuitry and one set of ECC decoding circuitry corresponding to a single media controller. In a memory controller with RAID architecture, there can be one set of ECC encoding circuitry and one set of ECC decoding circuitry for each of a plurality of media controllers.

In some embodiments, data can be written from the host to the DRAM memory device without first storing the data in the cache memory. The DRAM memory device can access host data in 64 byte chunks. Therefore, the cache memory will not need to store the 256 byte chunks of host data as 64 byte chunks before writing the data to the DRAM memory device. Since the host data can be written to the DRAM memory device without first storing the data in the cache, the cache memory can be disabled when writing data from the host to the DRAM memory device. In some embodiments, the cache memory can be disabled while writing the data to the DRAM memory device to decrease an amount of energy used to write the data to the DRAM memory device. The amount of energy used can be decreased because no energy would be used to write the data to the cache memory before writing the data to the DRAM memory device. In some embodiments, the DRAM memory device is configured to access host data stored in the host and the FeRAM memory device is configured to access the host data stored in the cache memory.

At block 454, the method 446 can include writing the data to the FeRAM memory device comprising ECC encoding the data, encrypting the data, writing the data to a cache memory couplable to the memory controller, and writing the data from the cache memory to the FeRAM memory device. In some embodiments, the FeRAM memory device can access data at a granularity of 64 bytes and the host can write data at a granularity of 64 bytes. A cache memory may be used to store host data and write the data to the FeRAM. In some embodiments, a cache line of the cache memory may store an amount of data that is greater than the granularity at which the host can write data. For example, a cache line of the cache memory may include 256 bytes. Therefore, in some embodiments, read requests and write requests from the cache memory may be read requests and write requests for 256 bytes of data.

Figure 5:
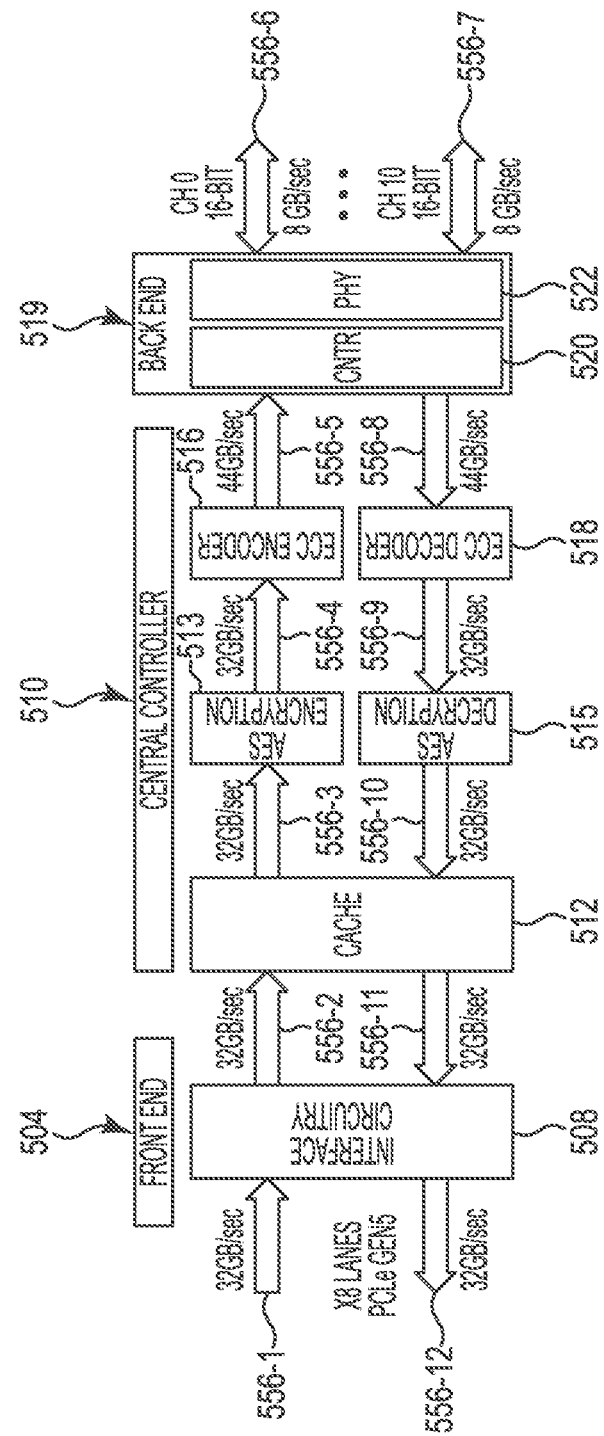
FIG. 5 illustrates a block diagram illustrating a flow of data through a controller for managing multiple types of memory in accordance with a number of embodiments of the present disclosure.

FIG. 5 illustrates a block diagram illustrating a flow of data through a controller for managing multiple types of memory in accordance with a number of embodiments of the present disclosure. The bandwidths 556-1, 556-2, 556-3, 556-4, 556-5, 556-6, 556-7, 556-8, 556-9, 556-10, 556-11, 556-12 (individually or collectively referred to as bandwidth 556) of the I/O bus between components in the front end portion 504, the central controller portion 510, and the back end portion 519 of a memory controller are shown. As used herein, the term "bandwidth" generally refers to a maximum amount of data written from one component in a memory system to another component within the same memory system or external to the memory system in a given amount of time.

As shown in FIG. 5, the front end portion 504 can include circuitry 508 for managing an interface between the host and the front end portion 504. In some embodiments, the interface can be a PCIE 5.0 interface including either 8 I/O lanes or 16 I/O lanes. In some embodiments, each of the I/O lanes between the host and the front end portion 504 may have a bandwidth 556-1, 556-12 of 32 gigabytes per second (GB/s).

The bandwidth 556-2, 556-11 of I/O circuitry between the front end portion 504 and the central controller portion 510 can be 32 GB/s. In some embodiments, the central controller portion 510 can include a cache memory 512, encryption circuitry 513, decryption circuitry 515, ECC encoder circuitry 516, and ECC decoder circuitry 518. In some embodiments the encryption circuitry 513 can be AES encryption circuitry 513 and the decryption circuitry 515 can be AES decryption circuitry 515. As shown in FIG. 5, data in the central controller portion 510 can be written from the cache memory to the AES encryption circuitry 513. In some embodiments, the bandwidth 556-3 of the I/O circuitry from the cache memory 512 to the AES encryption circuitry 513 can be 32 GB/s. The data can travel from the AES encryption circuitry 513 to the ECC encoder circuitry 516. In some embodiments, the I/O circuitry between the AES encryption circuitry 513 and the ECC encoder circuitry 516 can have a bandwidth 556-4 of 32 GB/s. Further, the I/O circuitry between the AES decryption circuitry 515 and the ECC decoder circuitry 518 can have a bandwidth 556-9 of 32 GB/s.

As shown in FIG. 5, I/O circuitry coupling the central controller portion 510 and the back end portion 519 of the memory controller can have a bandwidth 556-5, 556-8 of 44 GB/s. The back end portion 519 can include a media controller 520 and a PHY layer portion 522. The PHY layer portion 522 can couple to a DRAM memory device and a FeRAM memory device through a plurality of channels. In some embodiments, each of the plurality of channels can have a bus width of sixteen (16) bits and a bandwidth 556-6, 556-7 of 8 GB/s. Parity bits can consume 3/11 of the total bandwidth 556-6, 556-7 of a channel that connects the back end portion 519 to a DRAM memory device or an FeRAM memory device. The remaining data throughput can travel at a speed of 64 GB/s which matches a PCIe raw bandwidth for downstream data (e.g., 32 GB/s) added to upstream data (e.g., 32 GB/s). As used herein, the term "downstream data" can refer to data sent from a computer or network and the term "upstream data" can refer to data received by computer or network.

In some embodiments, downstream data can be data received by the memory controller and upstream data can be data sent from the memory controller. In some embodiments, the bandwidth 556 requirements can be modified (e.g., increased or decreased) based factors including, but not limited to, the efficiency of the bus (e.g., the PCIe bus) and/or the memory system, the cache hit rate, the efficiency of the media controller 520, and the DRAM memory device bus turnaround cycle, and the DRAM memory device bus rank-to-rank timing (e.g., rank switching). As used herein, the term "turnaround cycle" generally refers to the amount of time it takes for a memory device to alternate between a read operation and a write operation. As used herein, the term "rank-to-rank timing" generally refers to the time period between completing a memory operation on a rank of a memory device and starting a memory operation on another rank of the memory device.

Figure 6:
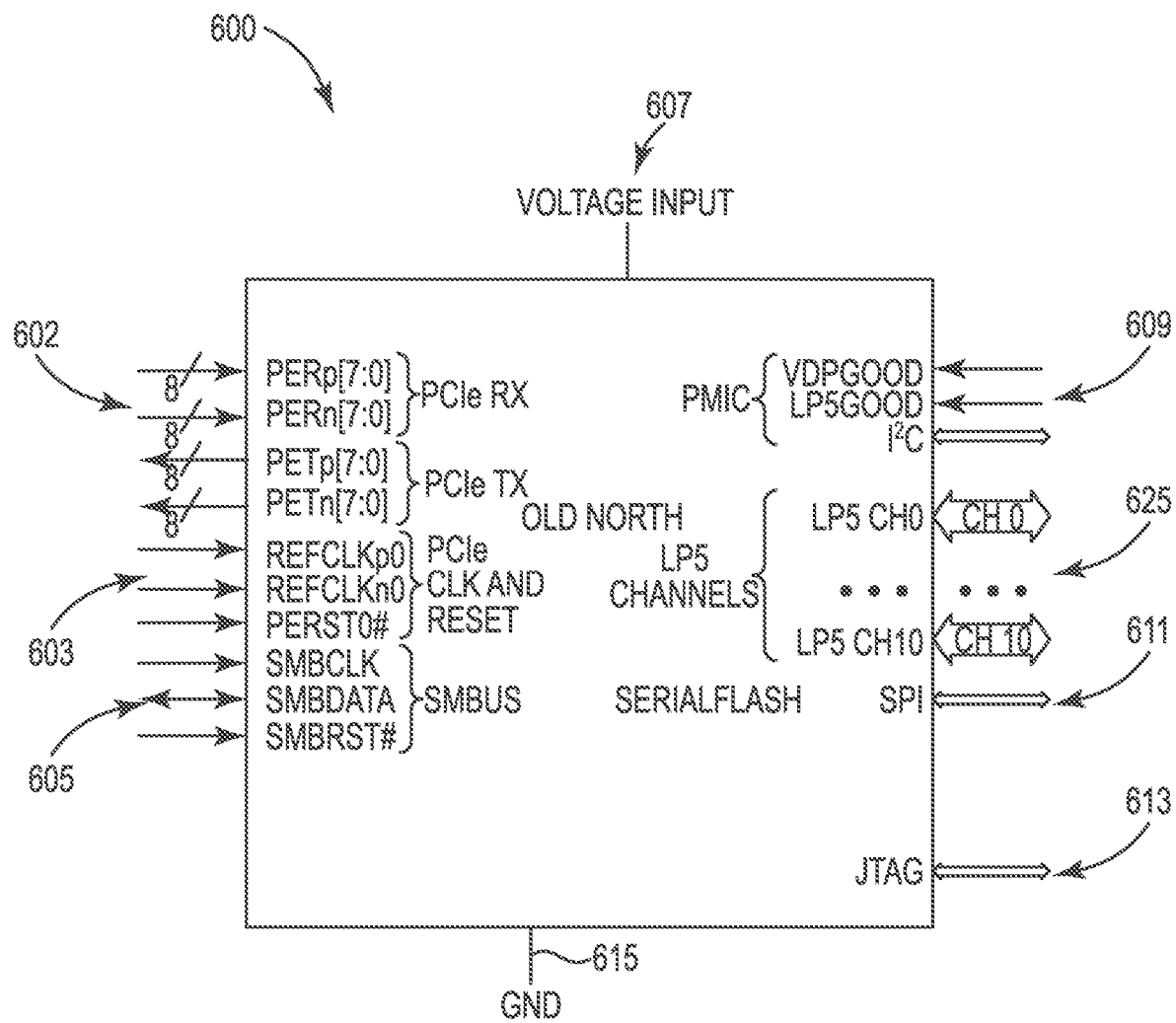
FIG. 6 illustrates a controller for managing multiple types of memory in accordance with a number of embodiments of the present disclosure.

FIG. 6 illustrates a memory controller 600 for managing multiple types of memory in accordance with a number of embodiments of the present disclosure. The memory controller 600 can include PCIe I/O lanes 602-1, 602-2, 602-3, . . . , 602-N (individually or collectively referred to as PCIe I/O lanes 602), PCIe clock and reset I/O lanes 603-1, 603-2, . . . , 603-N (individually or collectively referred to as PCIe clock and reset I/O lanes 603), and SMBus I/O lanes 605-1, 605-2, 605-3 (individually or collectively referred to as SMBus I/O lanes 605). Further, the memory controller 600 can include a voltage receiving bus 607, a plurality of power management integrated circuit (PMIC) I/O lanes 609-1, 609-2, 609-3 (individually or collectively referred to as PMIC I/O lanes 609), channels 625-1, . . . , 625-N (individually or collectively referred to as channels 625), a serial peripheral interface (SPI) 611, a JTAG bus 613, and a ground connection bus 615.

As shown in FIG. 6, the I/O lanes 602 can include PCIe RX (receiving) lanes and PCIe TX (transmitting) lanes. As stated above, the I/O lanes can write (e.g., transmit) data to a host and receive data from a host. The PCIe clock and reset lanes 603 can include at least one PCIe clock lane to determine the timing of data input and output to and from a memory system and at least one PCIe reset lane that can receive a signal to reset the memory system. Further, the SMBus I/O lanes 605 can include at least one SMBus clock lane to determine the timing of data input and output to and from the memory system, at least one SMBus data lane to write and receive data, and at least one SMB reset lane to receive a signal to reset the memory system.

As shown in FIG. 6 the PMIC I/O lanes 609 can include a lane to receive a VDDP voltage to stabilize a clock of the memory system at high frequencies and a lane to receive data from a low power double data rate $5^{th}$ generation (LPDDR5) memory component, and a lane to utilize an $I^2C$ protocol to connect low-speed memory components. Further, as shown in FIG. 6, the memory controller 600 can include channels 625 to couple the memory controller to at least one DRAM memory device and/or at least one FeRAM memory device, an SPI lane 611 used for short-distance communication, and a JTAG lane 613 to couple the memory controller 600 to an external memory component. Further, as shown in FIG. 6, the memory controller 600 can include a voltage input bus 607 to receive a voltage supply and a ground connection bus 615 to ground the memory controller 600.

Figure 7:
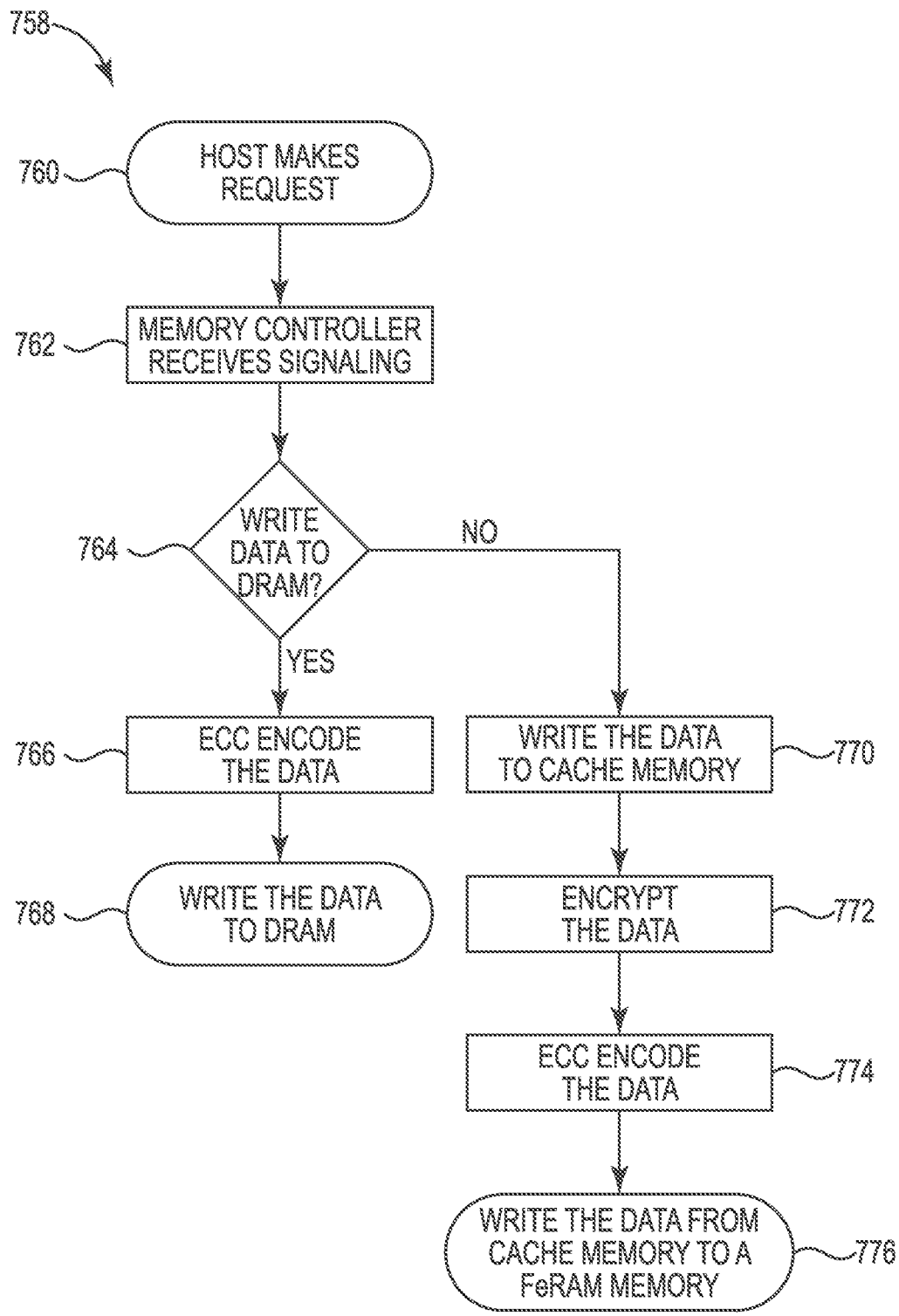
FIG. 7 is a flow diagram of an example method for managing multiple types of memory in accordance with a number of embodiments of the present disclosure.

FIG. 7 is a flow chart of an example flow diagram 758 for managing multiple types of memory in accordance with a number of embodiments of the present disclosure. At block 760, the flow 758 can include a host making a request. In some embodiments, the host can make a request to read data stored in a memory device or write data to a memory device, such as a DRAM memory device or a FeRAM memory device. The request can be sent to a memory controller in the form of a signaling.

At block 762, the flow 758 can include a memory controller receiving the signaling from the host. The memory controller can receive the signaling from the host through a plurality of I/O lanes. The memory controller can be coupled to multiple types of memory devices through a plurality of channels and can perform a memory operation on at least one of the memory devices based on the signaling received from the host.

At block 764, the flow 758 can include deciding whether to write data to the DRAM memory device. In some embodiments, when the memory controller receives a request from the host to write data to a memory device, that request can specify that the data be written to a specific type of memory device. For example, the request can specify whether to write the data to a DRAM memory device or a FeRAM memory device.

At block 766, the flow 758 can include ECC encoding the data responsive to the memory controller receiving a request from the host to write the data to the DRAM memory device. The data can be ECC encoded such that the data can be recovered even if there are errors in the data. In same embodiments, the data can be ECC encoded before the data is written to the DRAM memory device.

At block 768, the flow 758 can include writing the data to the DRAM memory device. The data can be written to the DRAM memory device in response to the memory controller receiving a request from the host to write the data to the DRAM memory device. In some embodiments, the data can be ECC encoded before being written to the DRAM memory device.

At block 770, the flow 758 includes writing the data to a cache memory. The data can be written to a cache line in a cache memory of the memory controller. In some embodiments, the data can be written to a 256 byte cache line in four 64 byte chunks. In some embodiments, an amount of data written in a memory transfer block from the memory controller to the cache memory is less than an amount of data associated with a cache line of the cache memory to reduce an amount of energy used to transfer the data from the memory controller to the cache memory. As used herein, the term "memory transfer block" can refer to an amount of data written to different memory locations.

At block 772, the flow 758 includes encrypting the data. The encryption can be an AES encryption. In some embodiments, the data can be ECC encoded before the data is encrypted. The data can be encrypted by a security component on the memory controller.

At block 774, the flow 758 can include ECC encoding the data. The data can be ECC encoded in response to the memory controller receiving a request from the host to write data to a memory device. In some embodiments, instead requesting that the data is written to the DRAM memory device, the host can request that the data be written to a FeRAM memory device.

At block 776, the flow 758 includes writing the data from the cache memory to a FeRAM memory device. The data can be written to the FeRAM memory device in response to the memory controller receiving a request from the host to write the data to the FeRAM memory device. In some embodiments, the data can be written to the FeRAM memory device through channels that couple the memory controller to the FeRAM memory device.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 216-1 to 216-N may be referred to generally as 110. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. An apparatus, comprising:
 a memory controller configured to manage a first type of memory device that operates according to a first set of timing characteristics and a second type of memory device that operates according to a second set of timing characteristics, wherein the memory controller comprises:
  a front end portion comprising:
   an interface that includes a plurality of input/output (I/O) lanes; and
   circuitry to manage the interface;
  a central controller portion configured to cause performance of a memory operation and comprising:
   a cache memory to store data associated with performance of the memory operation;
   a security component configured to encrypt the data before storing the data in the first type of memory device or the second type of memory device and decrypt the data before the data is transferred to the cache memory or a memory component that requested the data; and
   error correction code (ECC) circuitry to ECC encode and ECC decode the data;
  a back end portion comprising a media controller portion and a physical (PHY) layer portion to couple the memory controller to a plurality of memory ranks; and
  a management unit configured to monitor a plurality of characteristics of the memory controller, wherein the management unit comprises:
   an I/O bus configured to manage out-of-band data and commands;
   a management unit controller configured to execute instructions associated with initializing, configuring, and monitoring the characteristics of the memory controller; and
   management unit memory to store data associated with monitoring the characteristics of the memory controller.

2. The apparatus of claim 1, wherein the first type of memory device is a dynamic random access memory (DRAM) memory device and the second type of memory device is a ferroelectric random access memory (FeRAM) memory device.

3. The apparatus of claim 1, wherein the first set of timing characteristics comprises a bank active timing (tRAS) and other timings of the first type of memory device and the second set of timing characteristics comprises a tRAS of the second type of memory device.

4. The apparatus of claim 1, wherein the first set of timing characteristics correspond to a timings that are different from the second set of timing characteristics.

5. The apparatus of claim 1, wherein a page size of the first type of memory device is larger than a page size of the second type of memory device.

6. The apparatus of claim 1, wherein the first type of memory device and the second type of memory device differ in an amount of memory banks, a type of command encoding, a refresh command, or a refresh timing, or any combination thereof.

7. The apparatus of claim 1, wherein the PHY layer portion includes a plurality of PHY layers and the media controller portion is configured to drive a plurality of channels that couple PHY layers to the memory ranks.

8. The apparatus of claim 1, wherein the media controller portion comprises a plurality of media controllers, and
each of the plurality of media controllers receive a same command and drive the plurality of channels substantially simultaneously.

9. The apparatus of claim 1, wherein an amount of data transferred in a memory transfer block from the memory controller to the cache memory is less than an amount of data associated with a cache line of the cache memory to reduce an amount of energy used to transfer the data from the memory controller to the cache memory.

10. The apparatus of claim 1, wherein:
the memory controller is coupled to the plurality of memory ranks through a plurality of channels coupled to the back end portion, and
each of the plurality of channels is coupled to four (4) memory ranks.

11. The apparatus of claim 1, wherein the plurality of characteristics monitored by the management unit includes a voltage supplied to the memory controller or a temperature measured by an external sensor, or both.

12. The apparatus of claim 1, wherein the plurality of I/O lanes are configured to transfer access requests to or from circuitry external to the memory controller according to a compute express link protocol.

13. The apparatus of claim 1, further comprising a peripheral component interconnect express (PCIe) 5.0 interface coupled to the plurality of I/O lanes, wherein the memory controller is to receive access requests involving at least one of the cache memory, the first type of memory device, or the second type of memory device, or any combination thereof, via the PCIe 5.0 interface according to a compute express link protocol.

14. An apparatus, comprising:
a memory controller that is configured to manage a dynamic random access memory (DRAM) memory device having a first bank active timing (tRAS) and a ferroelectric (FeRAM) memory device having a second tRAS, wherein the memory controller comprises:
a front end portion comprising:
an interface that includes a plurality of input/output (I/O) lanes; and
a controller to manage the interface;
a central controller configured to cause performance of a read operation or a write operation, or both, wherein the central controller includes:
a cache memory to store data associated with the read operation or the write operation, or both, and increase a speed of accessing the data;
a security component configured to encrypt and decrypt the data before storing the data in the DRAM memory device or the FeRAM memory device and decrypt the data before the data is transferred to the cache memory; and
error correction code (ECC) circuitry to ECC encode the data and ECC decode the data;
a back end portion, comprising a media controller portion comprising a plurality of media controllers and a physical (PHY) layer portion comprising a plurality of PHY layers, wherein the back end portion is configured to couple the PHY layer portion to a plurality of memory ranks; and
a management unit configured to initialize, configure, and monitor a plurality of characteristics of the memory controller, wherein the management unit comprises:
an I/O bus configured to transfer out-of-band data and commands;
a microcontroller to execute instructions associated with monitoring characteristics of the memory controller; and
management unit memory to store data associated with monitoring the characteristics of the memory controller.

15. The apparatus of claim 14, wherein the central controller portion includes a finite state machine (FSM) and a plurality of redundant array of independent disks (RAID) components, and wherein the FSM is operable to increase a reliability of the data and correct errors in the data.

16. The apparatus of claim 15, wherein each RAID component is coupled to independent ECC encoding circuitry and independent ECC decoding circuitry.

17. The apparatus of claim 14, wherein the central controller portion includes low power chip kill (LPCK) circuitry to increase a reliability of the data and correct errors in the data.

18. The apparatus of claim 14, wherein:
the back end portion is connected to the plurality of memory ranks through a plurality of channels; and
each of the plurality of channels is coupled to five (5) memory ranks.

19. The apparatus of claim 14, wherein each media controller executes commands independent of other media controllers.

20. The apparatus of claim 14, wherein the plurality of I/O lanes are configured to transfer access requests to or from circuitry external to the memory controller at a rate of at least thirty-two (32) gigatransfers per second.

21. A system, comprising:
a host; and
a memory controller coupled to the host, wherein:
the memory controller is configured to manage a dynamic random access memory (DRAM) memory device having a first bank active (tRAS) and a ferroelectric random access memory (FeRAM) memory device having a second tRAS; and
the memory controller comprises:
a front end portion, comprising an interface configured to couple the memory controller to the host through a plurality of input/output (I/O) lanes; and
circuitry to manage the plurality of I/O lanes;
a central controller portion configured to, in response to receiving a request from the host, perform a memory operation, wherein the central controller portion comprises:
a cache memory to buffer data associated with performance of the memory operation;
a security engine configured to encrypt data before the data is stored in the in the DRAM memory device, the FeRAM memory device, or the cache memory;
error correction code (ECC) encoding circuitry to ECC encode the data; and
ECC decoding circuitry to ECC decode the data;
a back end portion comprising a media controller and a physical (PHY) layer, that is configured to couple the memory controller to a plurality of memory ranks; and a management unit configured to initialize, configure, and monitor a plurality of characteristics of the memory controller, wherein the management unit comprises:
an I/O bus configured to manage out-of-band data and commands;
a management unit controller to execute instructions associated with monitoring the plurality of characteristics of the memory controller; and
management unit memory to store data associated with monitoring the characteristics of the memory controller.

22. The system of claim 21, wherein the central controller portion is configured to, in response to receiving a request from the host, write multiple pages of data substantially simultaneously.

23. The system of claim 21, wherein the tRAS of the FeRAM is different from the tRAS of the DRAM.

24. The system of claim 21, wherein the plurality of I/O lanes is configured as a single port.

25. The system of claim 22, wherein the DRAM memory device is configured to access host data stored in the host and the FeRAM memory device is configured to access the host data stored in the cache memory.

26. A method, comprising:
receiving, by a central controller portion of a memory controller from a front end portion of the memory controller, signaling indicative of a data access involving a dynamic random access memory (DRAM) memory device or a ferroelectric random access memory (FeRAM) memory device, or both; and
writing data to the DRAM memory device or the FeRAM memory device, or both, in response to receiving the signaling, wherein:
writing the data to the DRAM memory device comprises:
error correction code (ECC) encoding the data; and
writing the data from circuitry external to the memory controller to the DRAM memory device; and
writing the data to the FeRAM memory device comprises:
ECC encoding the data;
encrypting the data;
writing the data to a cache memory couplable to the memory controller; and
writing the data from the cache memory to the FeRAM memory device.

27. The method of claim 26, further comprising disabling the cache memory while writing the data to the DRAM memory device to decrease an amount of energy used to write the data to the DRAM memory device.

28. The method of claim 26, further comprising writing unencrypted data to the DRAM memory device and writing encrypted data to the FeRAM memory device.

29. The method of claim 26, further comprising receiving the signaling at a rate of thirty-two gigatransfers per second or greater.

30. The method of claim 26, further comprising writing the data to the DRAM memory device or the FeRAM memory device, or both, via a plurality of memory ranks coupling the memory controller to the DRAM memory device and the FeRAM memory device.

* * * * *